May 16, 1950 — H. M. DUDEK — 2,507,664
MECHANICAL MOVEMENT
Filed Nov. 13, 1945 — 2 Sheets-Sheet 1
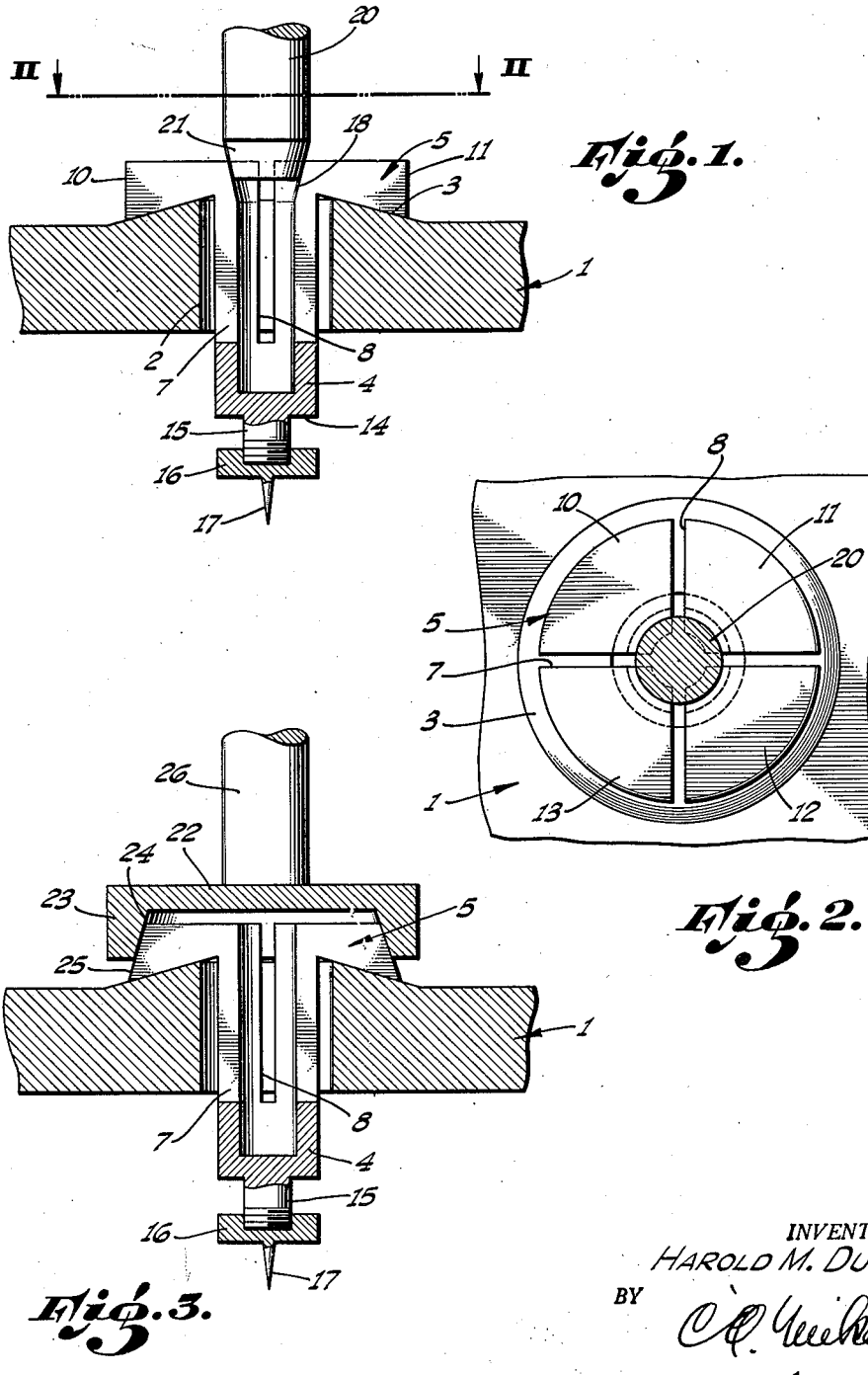
INVENTOR.
HAROLD M. DUDEK,
BY
ATTORNEY.

May 16, 1950     H. M. DUDEK     2,507,664
MECHANICAL MOVEMENT

Filed Nov. 13, 1945     2 Sheets-Sheet 2

INVENTOR.
HAROLD M. DUDEK,
BY
ATTORNEY.

Patented May 16, 1950

2,507,664

UNITED STATES PATENT OFFICE 2,507,664

MECHANICAL MOVEMENT

Harold M. Dudek, Altadena, Calif.

Application November 13, 1945, Serial No. 628,326

18 Claims. (Cl. 74—110)

This invention relates to a novel mechanical movement and particularly to a method of imparting a small longitudinal movement to a member in a novel manner. The invention also pertains to a combination and arrangement of elements whereby regulated, extremely small movements may be readily imparted to a base member.

In many forms of testing equipment as well as in devices such as range finders, telescopes, comparators, optical instruments of various kinds, devices for engraving or cutting diffraction plates, etc., it is necessary to move a lens, mirror, tool, light valve, contact or similar instrumentality a very small but precise distance. Vernier mountings have often been used but such expedients have not been found satisfactory in many instances.

The present invention is directed to a method of imparting longitudinal motion to a member provided with a furcated end by expanding the furcated end (or by contracting it) while such end is in contact with an inclined supporting surface, such inclined supporting surface intersecting the longitudinal axis of the member. The expansion or contraction of the furcated end is preferably attained by applying a wedge into the member or by applying a tapered element to the exterior surfaces of the furcated end of the member. Hydraulic or mechanical means may be used for expanding or contracting the furcated end, the direction of movement of the base of such member depending upon the inclination of the surfaces upon which the member is supported at its furcated end. Extremely compact, strong and stable means are thus provided and such means, employing the mode of operation herein disclosed, may be used on equipment subjected to vibration or shock and may be used not only in adjustably positioning very delicate means, such as scribers, prisms, etc., but may also be employed in regulatably moving valves or other objects subjected to high pressures.

An object of the present invention, therefore, is to disclose and provide a novel mechanical movement by means of which small movements may be imparted to tool-holding devices.

A further object of the invention is to disclose and provide a novel combination of elements whereby axial movement of an actuating element is translated into either an opposing or codirectional reduced movement of a member which carries a tool, lens, valve or other object.

These and other objects of the invention will become more apparent to those skilled in the art from the following description of exemplary forms embodying the mode of operation to which this invention is directed. In order to facilitate understanding, reference will be had to the appended drawings, in which:

Fig. 1 is a schematic representation in longitudinal section through one form of device.

Fig. 2 is a plan view of the device taken generally along the plane II—II of Fig. 1.

Fig. 3 is a longitudinal section through a modified form of the device.

Figure 4:
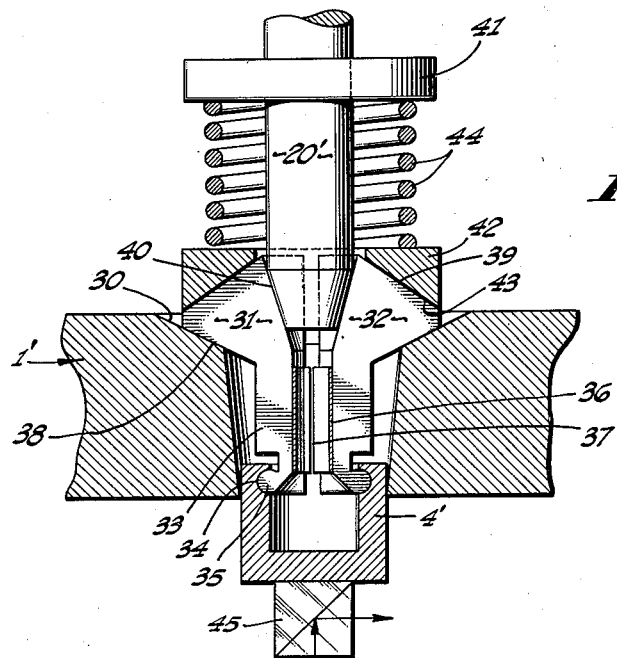
Fig. 4 is a longitudinal section showing a still further modification of a device constructed in accordance with this invention.

The mode of operation herein contemplated will be best understood from a consideration of Figs. 1 and 2. As there shown, a stationary, rigid support 1 is shown provided with a bore 2 and with a supporting surface surrounding the bore. The supporting surface may be conical and inclined to the transverse axis of the bore 2. Such upwardly and inwardly inclined supporting surface is indicated at 3.

Resting upon this inclined surface 3 is a substantially cylindrical element provided with an outwardly extending flange, the flanged end of the element being furcated. The cylindrical element is indicated at 4 and extends loosely through the bore 2. The flange is generally indicated at 5. The flange and a part of the body portion of the element 4 are axially slotted as at 7 and 8 so as to form flange portions 10, 11, 12 and 13. Although the element is shown provided with four end portions, it will be obvious that any desired number of portions may be used, depending upon the conditions and the machine or unit in which the device is to be employed.

The cylindrical element 4 is shown hollow but is provided with a closed base 14 opposite the flanged end. This base or head may carry any desired tool, such as a prism, engraving tool or the like. The base 14 is shown provided with a threaded axial stud 15 and a removable tool holder 16, the tool in the drawing constituting a scriber 17.

The lower surface of the flange 5 is provided with an inclined surface corresponding to the supporting surface 3. The inner surface of the hollow cylinder 4, at the flanged end, is provided with a tapered axial surface 18 and each of the flanged portions 10—13 is therefore provided with an opposing conical or tapered inner face.

Means are provided for applying an expansive force to the furcated end of the element 4 and such means may comprise a longitudinally movable actuating element 20 provided with a conically tapered end portion 21, the taper of the surface 21 corresponding in general to the taper of the surface 18.

The element 4 is preferably made of a strong, resilient metal or alloy such as steel, beryllium copper, Phosphor bronze, etc. When the actuating member 20 is forced into the furcated end of the element 4 (in any suitable and controllable manner and by any operable means), the flanged portions of such element are flexed outwardly and slide along the conical surface 3. The base 14 of the element 4 will also move downwardly but the degree of movement of the base will be a minor fraction of the downward movement of the actuating element 20. Downward movement of the element 20 will therefore be converted or translated into a downward movement of the base 14 and the tool 17 carried thereby, the ratio of movement thus attained depending upon the angularity or inclination of the surfaces 3, 18 and 21. When the actuating element 20 is withdrawn from within the furcated end of element 4, the resiliency of the cylindrical body portions of the furcated element will cause the flanged end to contract again, thereby raising the base 14 to its original position.

In the arrangement shown in Fig. 1, an expansive force is applied to the flanged end of the element 4. A contractile force may be similarly applied to obtain a similar movement. Fig. 3 schematically illustrates an arrangement wherein the outer, normally cylindrical surfaces of the flange 5 (or flange portions 10—13) are provided with a conical surface and the actuating element is in the form of a disc 22 provided with a downwardly extending flange 23, the inner surface of such flange being tapered as indicated at 24, such surface being adapted to cooperate with the inclined surfaces 25 on the ends of the flanged portions of the element 4. Any suitable means for moving the disc 22 may be used, means for imparting motion to the disc 22 in a direction coaxial with the axis of the element 4 being indicated at 26.

Fig. 4 illustrates still another modification. The supporting member 1' is shown provided with a downwardly directed conical surface 30 adapted to support the flanged end of the element 4'. The modification shown in Fig. 4 contemplates an element 4' provided with a furcated flanged end, the furcations being pivotally connected to the element instead of being integral with the element as in Figs. 1 and 3. Obviously, the flanged portions of the element 4 may be either integral or pivotally connected to the head of the element.

In Fig. 4 each of the flanged portions 31, 32, etc., is provided with a downwardly extending leg such as 33, the leg being pivotally connected to the head of the element 4'. The pivotal connection illustrated in Fig. 4 contemplates an annular groove 34 formed on the interior surface of the cylinder forming the head 4' of the element. Each of the legs such as 33 is provided with an outwardly extending semicircular bead 35 which fits into the annular groove 34. The various legs of the furcated portions 31, 32, etc., are spaced in a manner equivalent to the spacing afforded by the slots 7 and 8 of the previously described modifications. In order to prevent the various legs of the flanged portions 31, 32, etc., from collapsing altogether, a thin tube 36 rendered resilient by means of a single longitudinal slot 37 may be placed centrally between the various furcated portions.

The flanged portions 31, 32, etc., may be provided with a lower conical surface 38 virtually corresponding to the taper of the surface 30 and adapted to rest thereon, an upper outwardly and downwardly directed conical surface 39, and an inner upper conical surface 40, the latter surface being adapted to cooperate with the tapered end of an actuating member 20' passing through a suitable fixture or stop member 41.

A washer 42 may be provided with a conical surface 43 adapted to rest upon the surface 39, the washer 42 being normally seated upon and pressed against the upper surface of the flanged portions of the member 4' by means of a compression spring 44 bearing against the upper surface of the washer and the lower surface of the stationary element 41.

In the schematic showing appearing in Fig. 4 the head of the element 4' is shown provided with a prism 45, although any other tool, mirror, contact, valve or the like may be actuated by such element 4'. It will be evident that downward thrust by the actuating element 20' is converted into an expansion of the flanged portions of the element 4', the cooperation of the surfaces 30 and 38 translating the downward movement of member 20' into a differential upward movement of the head of element 4'. As soon as downward pressure on element 20' is relieved and such element is retracted, the spring 44 will force the ring 42 against the upper surface 39 of the flanged portions and automatically return such flanged portions to their original retracted position. The ratio between the axial motion of the actuating element 20' and the member 4' may be controlled by the inclination of the supporting surface 30 and to some extent by the inclination of the surface 40.

Moreover, it will be evident that the shoulder or element 41 need not be stationary but may be attached to the actuating element 20'. Furthermore, instead of using an annular semi-cylindrical ring or groove 34 on the interior surfaces of the cylindrical portion of element 4', the various furcated and flanged elements carried by 4' may be similarly hingedly or pivotally connected by means of an externally applied annular flange, the bosses 35 being then reversed in their direction. Moreover, it will be evident to those skilled in the art that spring means such as 44 may be used in conjunction with the devices shown in Figs. 1 and 3 for the purpose of facilitating the return of the furcated portions to their original position.

Figure 5:
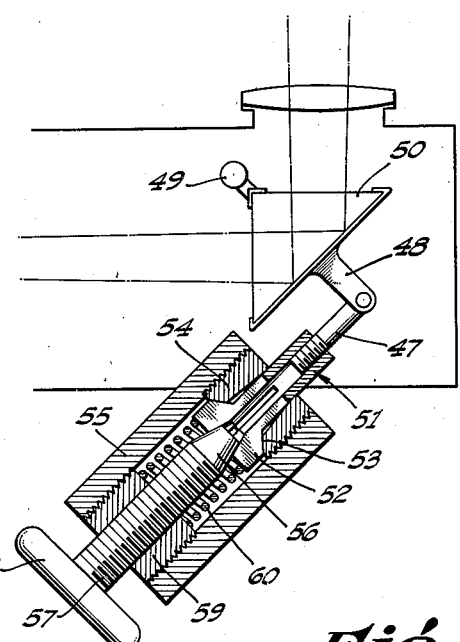
Fig. 5 illustrates an adaptation of the invention to a range finder.

Fig. 5 shows an adaptation of the method and means of the present invention as applied to the careful positioning and adjustment of a prism 50 in a range finder. The prism may be mounted for pivotal movement about the point 49. The rear of the prism may be connected as by means of the lug 48 to a head 47 of the element 51. This element, in common with the others previously described, includes a flanged portion at 52, the lower surface of the flange being inclined to the transverse axis and supported upon the inclined surface 53 of a stationary element 54 held within a housing 55. The internal tapered surface of the flanged portions of the element 51 are in contact with the tapered end 56 of a threaded shaft 57 provided with a hand wheel 58. The threaded shaft is in engagement with an internally threaded collar 59 carried by the housing 55. A compression spring 60 bears against the collar 59 and the top of the flanged portions 52.

It will be evident from an examination of Fig. 5 that rotation of the hand wheel 58 will move the actuating element 56 into sliding engagement with the supported end 52 of the element 51 so as to impart a radial motion to such supported end, the inclined surfaces 53 translating the radial motion into an axial movement by element 51 and head 47. Since the head 47 is pivotally connected to the lug 48, the entire prism 50 will be regulatably pivoted or adjusted about the pivot point 49.

Figure 6:
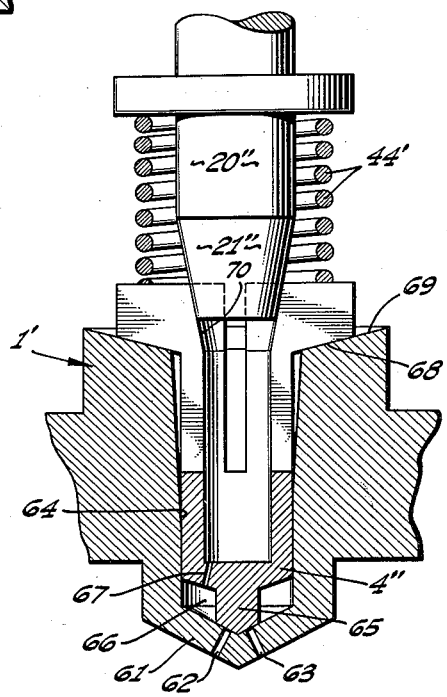
Fig. 6 illustrates an adaptation of the invention to an injection valve.

Fig. 6 diagrammatically illustrates the adaptation of the mechanical movement to an injection valve capable of being used in Diesel type engines. The wall of the chamber into which liquid is to be injected is shown at 1' and such wall is provided with an injection head 61 having injection ports 62 and 63. A well of circular cross section is formed in the wall, as indicated at 64, such well slidably receiving a cylindrical hollow element 4'' having a base or head 65 normally seated upon and closing the injection ports 62 and 63. Such head 65 may be surrounded by an annular chamber 66 in communication with the interior of the element 4'' by means of a port 67. The upper end of the element 4'' is flanged and furcated, the lower surfaces 68 of the flange being inclined from a transverse plane passing through the element 4'' and normally resting upon a similarly inclined supporting surface 69 forming a part of the wall 1'. Liquid under pressure may be present around the flanged furcated end of element 4'' and pass into such element through the slots separating the furcated portions of such element, thereby filling the annular chamber 66 with liquid. An actuating element 20'' provided with a tapered end 21'' slidably fits against tapered surfaces 70 formed on the interior of the flanged end of the element 4''. Any suitable means, such as a spring 44', may normally hold the element 4'' in seated position against the ports 62 and 63. Downwardly directed axial movement of the actuating element 20'' will, however, expand the furcated and flanged end of the element 4'', thereby causing the base and head 65 of the element 4'' to move upwardly and open the ports 62 and 63 to permit liquid from the annular chamber 66 to be discharged therethrough.

Those swilled in the arts will recognize that the mechanical movement herein disclosed has many adaptations and uses. The inclination of the surfaces which support the flanged, radially movable end portions of the element 4 may vary from 1° to 30°. The inclination of the surfaces which contact the actuating element 20 may similarly vary. The ratio or differential motion may thereby vary between wide limits. Although tapered actuating means for causing expansion or contraction of the radially movable portions have been illustrated in the drawings, other means for this purpose can be used. It is to be remembered that the inclined surfaces need not be conical and may be a series of circularly arranged flats. The term "inclined surface" or "surface inclined to the axis" as used herein relates to a conical or plane surface at an angle other than 90° or 180° to the axis of the head or body of the device.

All changes, modifications and uses coming within the scope of the appended claims are embraced thereby.

I claim:

1. In a mechanism for translating axial motion of an actuating member into a differential axial motion of an element, the combination of: an element provided with a head and a plurality of circularly arranged portions, each portion having an outwardly extending flange; a stationary support adapted to contact the lower surfaces of said flanges, each of said flanges being provided with an inclined surface in contact with said support and a virtually corresponding inclined surface on said support; and an actuating member cooperating with the portions and arranged to impart radial motion to the flanged portions while the latter are supported on said inclined surfaces.

2. In a mechanism for imparting limited axial motion to an element: an element provided with a head end and a radially expandable end, said radially expandable end including a plurality of portions, each provided with an outwardly extending flange; means for supporting the element by its flanges; means for imparting radially directed motion to the flanged end of the element while the element is supported by its flanges; and means for translating said radial motion into a differential axial motion of the head end of the element.

3. A mechanism of the character stated in claim 2 wherein the portions of the radially expandable end are integral with the head end of the element.

4. A mechanism of the character stated in claim 2 wherein the radially expandable portions are hingedly connected to the head end of the element.

5. A mechanism of the character stated in claim 2 wherein the means for translating radial motion into axial motion include cooperating surfaces on the flanged end of the element and on the supporting means inclined to a plane transverse to the axis of the element.

6. In a mechanism of the character stated, the combination of: an element provided with an inexpandable head end and a radially expandable end, said radially expandable end including a plurality of longitudinally extending portions circularly arranged around the axis of the element, each of said portions being provided with an outwardly extending flange; means for supporting the element by the flanges; an axially movable means for imparting radial motion to the flanged portion of the element while said element is supported by the flanges.

7. In a mechanism of the character stated, the combination of: an element provided with a solid, inexpandable head end and a radially expandable end, said radially expandable end including a plurality of longitudinally extending portions circularly arranged around the axis of the element, each of said portions being provided with an outwardly extending flange; means for supporting the elements by the flanges; means for imparting motion to the flanged portion of the element, in an outward, radial direction said means including an axially movable conical member adapted to slidably engage the flanged end portions of the element and means for converting the outward, radial movement of the flanged end portions into an axial movement of the solid end of the element while the element is supported by the flanged portions.

8. In a mechanism of the character stated, the combination of: an element provided with a head end and a radially expandable end, said radially expandable end including a plurality of longitudinally extending portions circularly arranged around the axis of the element, each of said portions being provided with an outwardly extending flange; means for supporting the element by the flanges; spring means for maintaining the flanges in contact with the supporting means; and means for imparting radial motion to the flanged portion of the element while the element is supported on said flanges.

9. In a mechanism of the character stated, the combination of: an element provided with a head end and a radially expandable end, said radially expandable end including a plurality of longitudinally extending portions circularly arranged around the axis of the element, each of said portions being provided with an outwardly extending flange; means for supporting the element by the flanges; means for imparting radial motion to the flanged portion of the element while the element is supported on the flanges; and means for translating such radial motion into an axial motion of the head end of the element.

10. In a mechanism of the character stated, the combination of: an element provided with a head end and a radially expandable end, said radially expandable end including a plurality of longitudinally extending portions circularly arranged around the axis of the element, each of said portions being provided with an outwardly extending flange; means for supporting the element by the flanges; means for imparting radial motion to the flanged portion of the element while said element is supported by the flanges, said means including an axially movable conical member adapted to slidably engage the flanged end portions of the element; and means for translating such radial motion into an axial motion of the head end of the element of a different magnitude than the magnitude of axial movement of the conical member.

11. In a mechanism of the character stated, the combination of: an element provided with a head end and a radially expandable end, said radially expandable end including a plurality of longitudinally extending portions circularly arranged around the axis of the element, each of said portions being provided with an outwardly extending flange; means for supporting the element by the flanges; spring means for maintaining the flanges in contact with the supporting means; means for imparting radial motion to the flanged portion of the element; and means for translating such radial motion into an axial motion of the head end of the element, said means including cooperating surfaces on the flanged end of the element and on the supporting means, said surfaces being inclined to a plane transverse to the axis of the element.

12. In a mechanism of the character stated, the combination of: an element provided with a head end and a radially expandable end, said radially expandable end including a plurality of longitudinally extending portions circularly arranged around the axis of the element, each of said portions being provided with an outwardly extending flange; means for supporting the element by the flanges; spring means for maintaining the flanges in contact with the supporting means; means for imparting radial motion to the flanged portion of the element, said means including an axially movable conical member adapted to slidably engage the flanged end portions of the element; and means for translating such radial motion into an axial motion of the head end of the element of a different magnitude than the magnitude of movement of the conical member, said means including cooperating surfaces on the flanged end of the element and on the supporting means, said surfaces being inclined to a plane transverse of the axis of the element.

13. In a mechanism of the character stated in claim 8, the provision of means interposed between the spring and the flanged portion of the element tending to oppose radial motion imparted to the flanged portion by the radial motion imparting means.

14. A mechanism of the character stated in claim 11 including the provision of means interposed between the spring and the flanged portion of the element tending to oppose radial motion imparted to the flanged portion by the radial motion imparting means.

15. In a mechanism for imparting a limited and differential axial motion to an element, the combination of: a fixed support; an element provided with a relatively solid head and a radially expandable end including a plurality of portions, each provided with an outwardly extending flange, said element being supported by contact of the flanges with the fixed support; an axially movable member cooperating with the expandable, flanged end portion arranged to impart outward, radial movement to the flanged end portions; and means, including inclined cooperating surfaces on said flanges and on said fixed support for translating the radial movement of the flanged end portions into a differential axial movement of the head end of the element.

16. In a mechanism for imparting a limited and differential axial motion to an element, the combination of: a fixed support provided with a bore; an element provided with a relatively solid head and a radially expandable end including a plurality of portions, each provided with an outwardly extending flange, said element extending through said bore and being supported by contact of the flanges with the fixed support; an axially movable member cooperating with the expandable, flanged end portion arranged to impart outward, radial movement to the flanged end portions; and means, including inclined cooperating surfaces on said flanges and on said fixed support adjacent said bore for translating the radial movement of the flanged end portions into a differential axial movement of the head end of the element.

17. In a mechanism of the character stated, the combination of: a member provided with a relatively solid head at one end and an operating end at the other; a support for the operating end; axially movable actuating means arranged to apply transversely directed forces to the operating end of said member; and means, including said support and operating end, for translating said transversely directed forces into an axial movement of the relatively solid head of the member of a different magnitude than the axial movement of the actuating means.

18. In a mechanism for imparting a limited and differential motion to an element, the combination of: a fixed support; an element provided with a relatively solid head at one end and a plurality of radially movable portions in engagement with the other end of the element, each of said portions having a face in a plane intersecting the axis of the element, said element being supported by contact of said faces with the fixed support; an axially movable member cooperating with said portions and arranged to impart radial movement to said portions; and means, including said faces and cooperating surfaces on the fixed support, for translating radial movement of the portions into a differential axial movement of the head of the element.

HAROLD M. DUDEK.

REFERENCES CITED

The following references are of record in the file of this patent:

UNITED STATES PATENTS

| Number | Name | Date |
| --- | --- | --- |
| 1,250,532 | Wrich | Dec. 18, 1917 |
| 1,578,966 | Edelmann | Mar. 30, 1926 |
| 1,830,649 | Evans | Nov. 3, 1931 |
| 2,358,299 | Benjamin et al. | Sept. 19, 1944 |